United States Patent [19]
Kachaylo

[11] 3,937,210
[45] Feb. 10, 1976

[54] CONDENSER LID
[75] Inventor: John Kachaylo, Los Angeles, Calif.
[73] Assignee: The Raymond Lee Organization, Inc., New York, N.Y. ; a part interest
[22] Filed: Sept. 3, 1974
[21] Appl. No.: 502,514

[52] U.S. Cl. ............... 126/384; 126/381; 220/4 A
[51] Int. Cl.² ........................................ A47J 27/00
[58] Field of Search ........ 126/381, 384, 299 C, 383, 126/385, 386; 220/44 A X

[56] References Cited
UNITED STATES PATENTS

| | | | |
|---|---|---|---|
| 173,448 | 2/1876 | Davis | 126/381 |
| 263,049 | 8/1882 | Krehbiel | 126/381 |
| 3,809,064 | 5/1974 | Ziegler | 126/381 |

Primary Examiner—Edward G. Favors
Attorney, Agent, or Firm—Howard I. Podell

[57] ABSTRACT

A condensor lid assembly for fitting on top of a pot containing boiling water which condenses the water vapor, and channels the distilled water to a dispensing outlet. The assembly consists of a conical lid which fits over a circular rim in the form of a U-shaped channel that rests on a conventional pot. An outlet tube is mounted in the side of the rim channel.

3 Claims, 4 Drawing Figures

U.S. Patent  Feb. 10, 1976  3,937,210
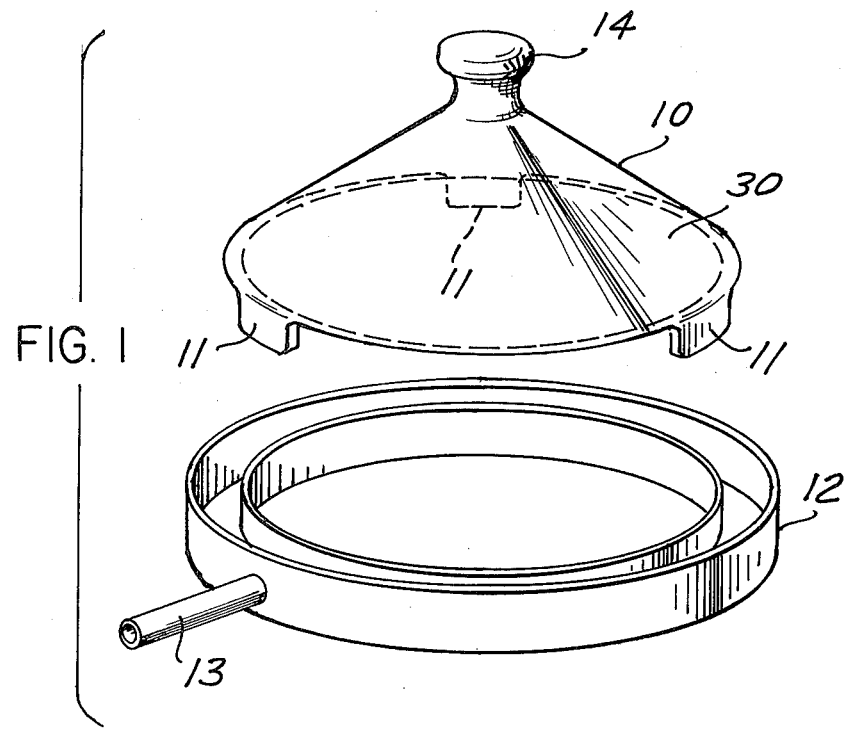
FIG. 1
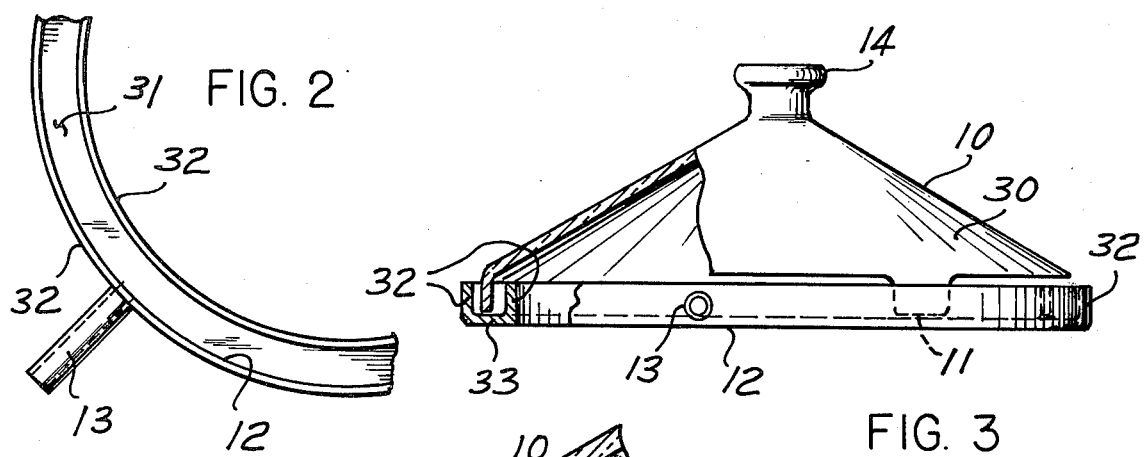
FIG. 2
FIG. 3
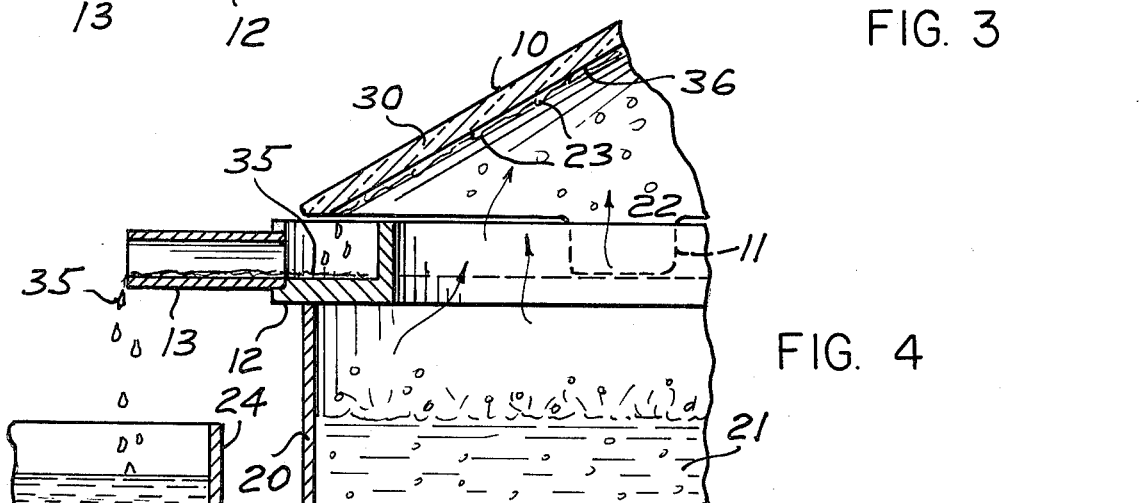
FIG. 4

CONDENSER LID

SUMMARY OF THE INVENTION

My invention relates to a condensor lid assembly which may be readily mounted on the open top of a pot of boiling water for production of distilled water.

The assembly consists of a removable conical shaped condensor lid which rests on a circular rim formed of a U-shaped channel in which the distilled water collects after it condenses on the inside surface of the lid. An outlet tube is mounted in an external wall of the rim for guiding the distilled water into a collection bottle.

BRIEF DESCRIPTION OF THE DRAWINGS

The objects and features of the invention may be understood with reference to the following detailed description of an illustrative embodiment of the invention, taken together with the accompanying drawings in which:

FIG. 1 is an exploded perspective view of the condenser lid and circular channel rim;

FIG. 2 is a fragmentary plan view of the circular channel rim;

FIG. 3 is a side view of the assembly; and

FIG. 4 is a partial sectional view showing the invention in use.

DESCRIPTION OF THE PREFERRED EMBODIMENT:

Turning now descriptively to the drawings, in which similar reference characters denote similar elements throughout the several views, FIGS. 1–3 illustrate the condensor lid assembly 10 which consists of a conical shaped lid 30 preferably formed of glass or metal fitted with projecting legs 11 that rest in the circular groove 31 of a size to fit on top of an open pot 20.

The lid 30 is fitted with an external control knob 14.

Circular rim unit 12 is shaped with two concentric circular walls 32 that join a common rim bottom 33. An outlet tube 13 is fitted on one external rim wall 32 for leading distilled water 35 collected in the groove 31, formed by walls 32, into a collection bottle 24.

In use, the assembly 10 is mounted on top of an open pot 20 containing boiling water 21. The water vapor 22 rises and condenses against the inner surface of the air-cooled lid 30 forming droplets 23 that adhere to the inner surface 36 of the lid 30 and flow down into the periphery of the lid 30, dropping off into the circular rim groove 31.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A condenser lid assembly for condensing and collecting distilled water when placed on top of a pot containing boiling water comprising a lid, and a circular collection rim unit, which may be rested upon the top of an open pot, said rim unit shaped with a pair of concentric walls joined to a common circular bottom section so as to form a circular groove open to the top, with the outer wall of the rim unit fitted with a spout that extends beyond the periphery of the rim unit for the purpose of draining collected condensed water, draining from the lid into the groove, out of said groove and away from a pot of boiling water upon which the assembly is rested.

2. The combination as recited in claim 1 in which the lid is shaped in the form of a cone and fitted along its bottom periphery with means to seat in the groove of the rim unit.

3. The combination as recited in claim 2 in which the groove of the rim unit is U-shaped.

* * * * *